United States Patent Office 3,336,819
Patented Aug. 22, 1967

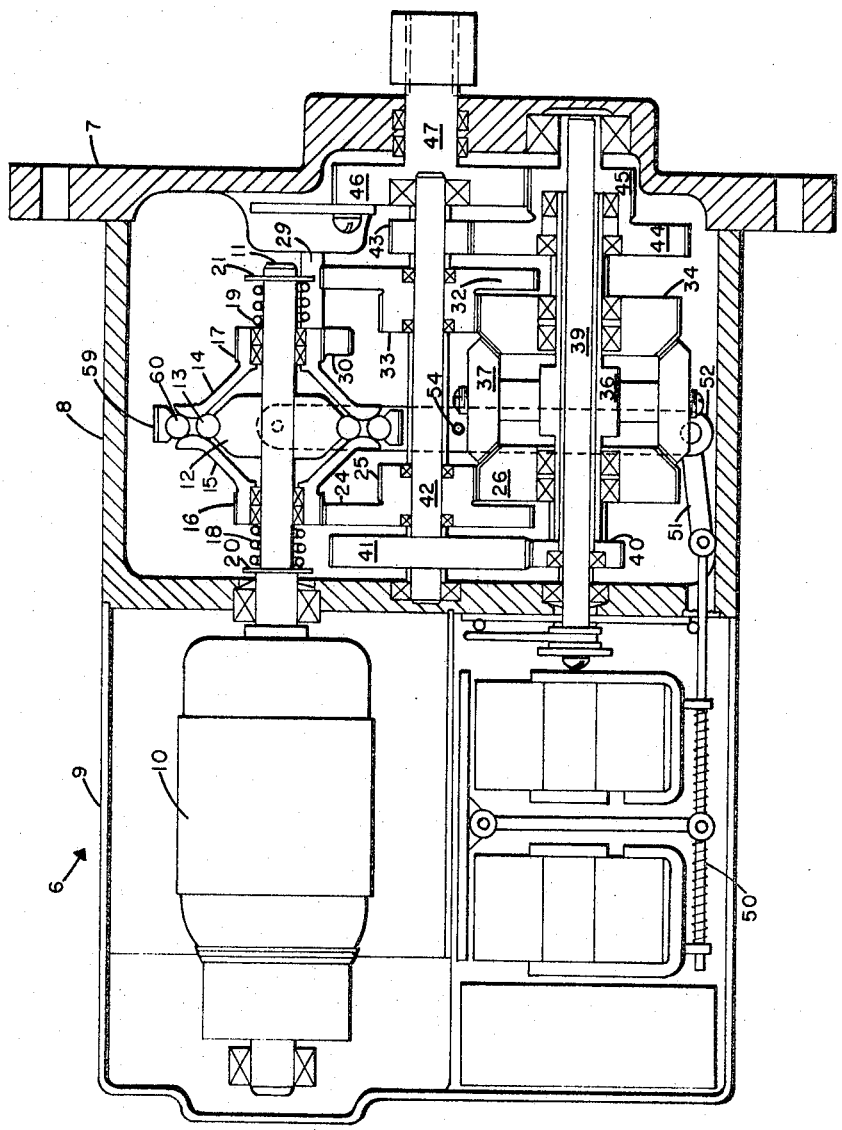

3,336,819
CONTROL APPARATUS
Keith C. Jones, Roseville, Minn., assignor to Honeywell Inc., a corporation of Delaware
Filed Mar. 11, 1964, Ser. No. 351,175
4 Claims. (Cl. 74—674)

This invention relates to reversible load positioning control apparatus and more particularly to improved mechanical transmission arrangement disposed between an actuator, such as an electric motor continuously operated in one direction, and a reversibly operable load device, such as a control surface of an aircraft, positioned thereby.

With greater particularity this invention pertains to mechanical transmission arrangements between an actuator and a load device incorporating a multiple of drive elements or a gear train such as a mechanical differential.

Transmission arrangements utilizing a mechanical differential have been used heretofore, for example, see the patent to W. H. Gille Number 3,031,158, FIGURE 2.

In the above patent, FIGURE 2 shows a continuously rotating motor 57 and what may be termed an output shaft 56 which through a cable drum 80 and cables 81 positions a control surface of an aircraft.

In the power transmission means of the above patent, duel sun gears 167 and 175 are held or locked against rotation normally so that the output shaft 56 is locked against unwanted rotation due to aerodynamic loading. When a selective rotation of the output shaft is desired, one or the other of the dual gears 167, 175 including its drive train must be initially accelerated and rotated from a stationary position while the other remains locked, to effect planetary motion of the spider 173 and rotation of output shaft 56.

Consequently in the above patent if it is desired to change rapidly the position of the output shaft 56 it is necessary therefore to first angularly accelerate either one or the other of the locked dual gears 167, 175 as well as its drive gear, which until rotation of shaft 56 was desired had been stationary.

An object of this invention is to provide a novel transmission arrangement incorporating a mechanical differential wherein the sun gear that powers a load device is up to rotational speed when it is selected drive such load device.

An object of the present invention is to provide an improved transmission between a motor and load by causing continuous rotation of the sun gears of a mechanical differential in said transmission which through rotations in opposite directions cause no rotation and prevents rotation of the spider of the differential and thus of the output shaft for the normal operating conditions and alternately locking either sun gear against rotation to effect rotation of the output shaft.

It is a further object of this invention to provide between a continuously rotating motor and a load device to be positioned a power transmission arrangement including a mechanical differential wherein a higher response of movement of the load device to a command for movement of the load is provided.

A further object of this invention is to provide an improved high performance power transmission arrangement between a continuously running motor and a load device, incorporating a mechanical differential gear train.

A further object of this invention is to provide an improved high performance power transmission arrangement between a continuously running motor and a load device, incorporating a mechanical differential gear train, having sun gears that are normally continuously rotating simultaneously in opposite directions and engaged to hold a spider against rotation.

A further object of this invention is to provide an improved high performance power transmission arrangement between a continuously running motor and a load device, incorporating a mechanical differential gear train, having sun gears that may be selected to drive a load device and need not be accelerated when such selection is made.

The above and other objects of the invention will more fully appear from a consideration of the accompanying description taken in connection with the accompanying drawings.

The drawing is a sectional view and plan of the improved power transmission means for an electric motor;

In the apparatus to be described, a load device, such as a control surface for an aircraft may be reversibly operated from a low torque-high speed motor means such as a continuously rotating electric motor through a power transmission arrangement. The load device is positioned through the rotation of the spider of a mechanical type differential having sun gears interconnected with spider pinions. The sun gears when the load device is not being operated are oppositely driven at the same rotational rate through individual coupling means extending to a member continuously driven by the motor. Rotation of the spider is effected by reducing the relative rotational rates of the sun gears or by locking one or the other of the rotating sun gears thereby permitting planetary action of the spider gear about the now locked sun gear. Thus in the above arrangement it is unnecessary to initially accelerate the sun gears as well as the load device during rapid positioning of the load device.

Referring to FIGURE 1, a load control apparatus 6 comprises a base plate 7 which carries a supporting member 8 and a cover 9. Within the cover 9 there is suitably mounted a motor means such as an electric motor 10 rotatable continuously in one direction and having an output shaft 11. Fixed for rotation with shaft 11 is a clutch drive member 12 which generally is circular in configuration and carries on its periphery a resilient ring 13 which may be an O-ring. Ring 13 frictionally engages the clutch driven members 14, 15 freely rotatable on shaft 11 which carry pinions 16, 17 mounted thereto. The clutch driven members 14, 15 are biased into engagement with the ring 13 by helical springs 18, 19 circling shaft 11 which for this purpose bear against suitable collars 20, 21 on shaft 11. Thus rotation of the clutch driven member 12 with shaft 11 is communicated by frictional engagement of ring 13 with the clutch driven members 14, 15.

Pinion 16 engages a large gear 24 of a double gear having its smaller gear 25 engaged with one sun gear 26 of a mechanical type differential 27.

Pinion 17 engages a pinion 30 carried on an adjacent shaft 29, the same having also a reversing gear 31 thereon (not shown to avoid confusion in illustration) meshing with a large gear 32 of a double gear having a smaller gear 33 engaged with a second sun gear 34 of differential 27. Differential 27 includes a spider 36 carrying as conventional a gear 37 meshing with both sun gears 26 and 34. Spider 36 is fixed to a shaft 39 to which is fixed a small drive pinion 40 meshing with a large gear 41 on a counter shaft 42 which carries a small pinion 43 meshing with a larger gear 44 rotatably on shaft 39. Gear 44 is a part of a double gear having a smaller gear 45 thereof meshing with a larger gear 46 fastened to an output shaft 47 of the reversible load positioning apparatus. The operation of shaft 47 may position a load device such as an aircraft control surface, for example.

With the motor means 10 energized and shaft 11 rotating such rotation is transmitted through the drive member 12 to the opposed driven members 14, 15 and through gears 16, 24, 25, in one case, gear 17, reversing gear 30 and gears 31, 32, 33 in the other case to the sun gears 26, 34 of differential 27 which are respectively rotated at the same speed but in opposite directions with the result that there is no rotation of the spider 36 and the spider gear 37 merely rotates on its own axis without engaging in any planetary movement. Due to such rotation of the sun gears 26, 34 in opposite directions, the shaft 39 fixed to the spider 36 is held against rotation. Thus there is no rotation of the output shaft 47 of the load positioning apparatus 6.

In order to obtain rotation of the shaft 39 by varying the relative speeds of the sun gears 26, 34 to achieve planetary action of spider gear 37, a clutch-brake linkage apparatus is provided. This linkage comprises a longitudinally movable member 50 which may be solenoid operated. Movement of member 50 is transmitted through a link 51 to a single end 52 of a fork member 53 which is pivoted at 54. The forked end of member 53 engages the opposite sides of a circular member 59 concentric with shaft 11. Member 59 carries an internal resilient ring 60. By operation of the member 50, the ring 60 may be brought into engagement with either of the clutch driven members 14 or 15 and they may be moved thereby axially along shaft 11 against the opposition of their retaining springs 18, 19 to be disengaged from the clutch drive member 12 carrying ring 13. Thus when the clutch driven members 14, 15 are thus engaged by the resilient ring 60 they are disengaged from frictional contact with drive member 12 and may be held against further rotation, thereby the rotating speed of one sun gear 26 may be varied relative to that of the other sun gear 34.

By such relative rotation rate difference, planetary action is applied to the spider 36 and rotation applied to the shaft 39 and through the differential output step down gear train 40, 41, 43, 44 45, 46 rotation is applied to output shaft 47.

If the speed reduction by gear train or coupling 24, 25 between the gear 16 and 26 along with the gear train 30, 31, 32, 33 between the driven gear 17 and sun gear 34 provide the proper speed reduction, the spider 36 connected to the shaft 39 may directly effect the operation of an output shaft without going through the further gear reduction stated. Thus by means of the gear reduction between shaft 11 and shaft 39, the high speed, low torque of motor means 10 may be applied to a low speed, high torque output shaft.

It will be noted that under normal conditions with member 12 through its ring 13 driving the two clutch members 14, 15 to provide equal and opposite rotations of the sun gears 26, 34, that these sun gears are at their operating speeds. In other words, they require no angular acceleration when it is desired to rotate the output shaft be it shaft 39 or 47 as the case may be. Because the sun gears and their drive trains are thus at operating speeds their rotational inertias need not be overcome by the motor means 10 when driving the output shaft. Thus a high response of the output shaft to commands is derived through operation of the linkage comprising member 50. The object of high response might better be broken down into its elements of acceleration of load and deceleration of load. The high ratio in actuators of several thousand makes external load not as dominant as first few stages of gearing (traveling at 8–12,000 r.p.m.). These early stages do not accelerate at the expense of the motor, but half train decelerates against a stop which assures a rapid output acceleration without motor droop. When the pulse is cut-off and the load is to be decelerated, the early half train stage of gearing is accelerated against the motor and the back half of the differential train; thus the motor droop is not reflected in the output since the pulse cut-off is dependent on the two halves of train approaching same velocity, not on absolute motor velocity.

It may be noted that in the present invention, if the speed of one gear train such as that comprising gears 24, 25 be reduced to provide rotation of shaft 39, the rotational rate of these gears 24, 25 is thereafter brought up to operating speed during the period when no operation of the output shaft 39 or 47 is required.

It will be apparent that there has been provided a novel transmission arrangement including a mechanical differential between a source of power and an output shaft and wherein the differential includes a pair of sun gears which are rotating at operating speeds at the time of application of torque to such output shaft. In the prior art is has been necessary to initially accelerate one or the other of such gears at the moment rotation of the output shaft was desired. It is now obvious that the subject arrangement provides a more immediate response to the control input such as one that might operate the member 50 to obtain rotation of the output shaft.

What is claimed is:

1. Control apparatus for an aircraft having a control surface operable by an output shaft, comprising: a driving motor continually rotating in one direction, a driving member rotated by said motor in one direction, a pair of driven members directly contacting the driving member and normally simultaneously operative by the driving member; a mechanical differential having a pair of sun gears and a spider, having a planet gear rotatably mounted thereon meshing with the sun gears, connected to the output shaft; power transmission means connecting one driven member with one sun gear for normal continual rotation thereof in one direction; power transmission means connecting the other driven member to the other sun gear for normal continual rotation thereof in the opposite direction so that no planetary action by this spider mounted gear occurs; and a common selective operable means operatively connected to the driven members altering the relative rotational rates of the two sun gears thereby effecting planetary motion of the spider mounted gear and operation of the output shaft.

2. In a motion transmission arrangement between a low torque-high speed rotating motor and a high torque-low speed rotational load device, comprising:
   a mechanical differential having two sun gears and a spider;
   means for connecting the spider to the load device;
   a common drive member continuously driven in one direction by the motor;
   two rotational speed step-down mechanical drive trains, each including the common drive member normally directly engaging an axially movable auxiliary driven member in each drive train, one train connecting the common drive member to one sun gear, the other train connecting the common drive member to the other sun gear, so that both sun gears normally rotate simultaneously at the same rate but in opposite directions so that the spider gears merely rotate on the spider frame with no planetary movement, the sun gears and drive trains thereby having a substantial angular momentum.

3. The apparatus of claim 2; and a common selective means moving one or the other of the auxiliary members away from the common drive member for decreasing the rotation rate of one sun gear and its momentum while said other sun gear due to its momentum continues to rotate at substantially the same rate so that the spider pinions have planetary action about the one sun gear and operate the load device.

4. A motion transmission arrangement between a low torque-high speed motor and high torque-low speed load device comprising:
   a shaft adapted to be connected to the load device;
   a differential planet gear on said shaft;
   a pair of gears co-axial with said shaft engaging said planet gear;
   a motor shaft continuously driven by the motor in one direction;
   a pair of drivable gears on said motor shaft but rotatable relatively thereto;

a variable speed drive train between the motor shaft and one coaxial gear comprising one drivable gear and a driving member fixed on the motor shaft;

a variable speed drive train between the motor shaft and other coaxial gear comprising the other drivable gear and driving member on the shaft so that the pair of coaxial gears rotate in opposite directions; and selective means locking either continuously rotating drivable gear against rotation to enable the other coaxial gear to drive the planet gear to position said shaft connected to the load device.

References Cited

UNITED STATES PATENTS

| | | | |
|---|---|---|---|
| 516,917 | 3/1894 | Coleman | 74—757 |
| 1,727,232 | 9/1929 | Farrell | 74—689 |
| 1,802,112 | 4/1931 | Henderson et al. | 74—705 |
| 2,377,013 | 5/1945 | Johnson | 74—689 |
| 2,682,785 | 7/1954 | Cerutti et al. | 74—674 |
| 2,929,268 | 3/1960 | Ferro et al. | 74—674 |
| 2,948,161 | 8/1960 | Levin | 74—780 |
| 3,031,158 | 4/1962 | Gille | 244—77 |
| 3,182,631 | 5/1965 | Gomes | 74—674 |
| 3,242,769 | 3/1966 | Johnson | 74—756 |

FOREIGN PATENTS 916,276   8/1946   France.

DONLEY J. STOCKING, *Primary Examiner.*

THOMAS C. PERRY, DAVID J. WILLIAMOWSKY,
*Examiners.*